Dec. 13, 1966  J. W. DRINKWATER  3,290,930
ACOUSTIC WIRE STRAIN GAUGES
Filed May 29, 1964  2 Sheets-Sheet 1

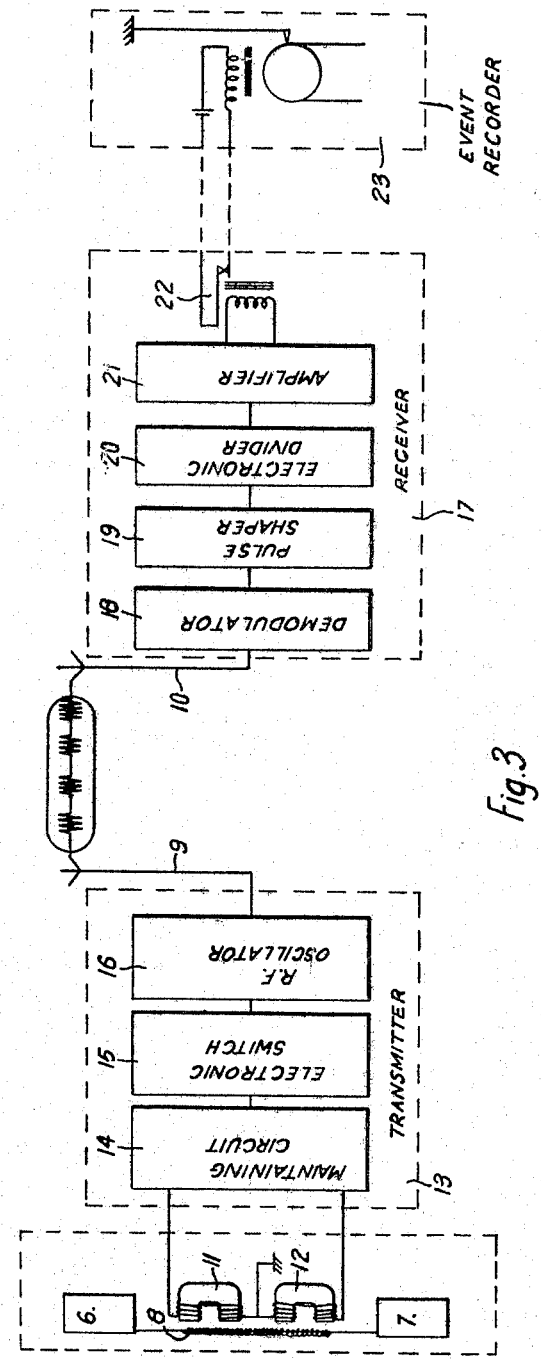

United States Patent Office 3,290,930
Patented Dec. 13, 1966

3,290,930
ACOUSTIC WIRE STRAIN GAUGES
John W. Drinkwater, Upton-by-Chester, England, assignor to Shell Oil Company, New York, N.Y., a corporation of Delaware
Filed May 29, 1964, Ser. No. 371,221
Claims priority, application Great Britain, June 4, 1963, 22,161/63
3 Claims. (Cl. 73—136)

This invention relates to acoustic wire strain gauges, especially when used for measuring strains in rotating shafts, for example in measuring the torque in terms of the frequencies of vibration of such strain gauges when under strain on the shaft.

Measurement in this way of strains in a rotating shaft, for example to estimate the torque being transmitted by the shaft, can be done by the use of an acoustic strain gauge extending transversely to the axis of the shaft and attached by its two ends to points spaced by a precise distance along the length of the shaft. The twist in this length is to be used as a measure of the torque in the shaft, the angle of twist being proportional to the torque. The twist in the shaft changes the tension in the wire which in turn changes its natural frequency and if the relation between frequency and strain characteristic is known for the wire of the gauge, this frequency can be taken as a measure of the strain in the wire. The torque in the shaft is related to this strain by an independent calibration factor. Vibration of the wire strain gauge induces an E.M.F. in a pick-up coil situated in close proximity to said wire gauge, which E.M.F. can be fed to an amplifier, and the frequency of the amplified E.M.F. as well as being measured can then be fed back to a second coil so as to maintain the wire in vibration.

For this purpose it has hitherto been the practice to convey the E.M.F. from the pick-up coils, which necessarily rotate with the shaft, to the amplifier by means of slip rings. Moreover, the measurement of the frequency has hitherto been effected by the adjustment of a reference frequency until it matches the frequency to be recorded. The use of slip rings is, however, undesirable since they are unreliable and bulky and furthermore, the method of frequency comparison that has been employed to measure the frequency of the strain gauge cannot be used with fluctuating torque.

It has now been found that these drawbacks can be avoided by transmitting the frequency of the strain gauge to the receiving equipment by a radio frequency carrier thereby eliminating the direct electrical contact of the slip rings. The invention therefore is concerned with an improvement in the method of measuring a strain in a rotating shaft by observing the frequency of an alternating E.M.F. induced in a coil by the vibration of a wire placed under a tension depending upon said strain, which method is hereinafter referred to as a method of the kind described.

According to the present invention a method of the kind described for measuring strains in a rotating shaft comprises imposing the frequency of an acoustic wire strain gauge by pulse modulation on the output signal of a radio transmitter rotating with said shaft, receiving said signal in a radio receiver and counting the number of pulses to ascertain the strain in the shaft. The invention also includes an apparatus for measuring strain in a rotating shaft, said apparatus comprising an acoustic wire strain gauge adapted to be attached to the shaft and to share the strain to be measured, coils adjacent to said wire to carry an E.M.F. induced by the vibration of said wire, a radio transmitter adapted to be mounted on said shaft and to emit a radio signal modulated by said E.M.F., a radio receiver for receiving said signal, circuit for demodulating said signal to give a low frequency wave and means for counting and/or recording the frequency of said wave.

In operation, when measuring the torque in a shaft two wire strain gauges may conveniently be employed, both under tension, the tension in one being increased by the twist in the defined length of the shaft while the tension in the other is diminished. The frequencies of the two wires are therefore changed in opposite directions and both frequencies may be observed. The vibration of each wire strain gauge actuates a radio transmitter which may be mounted on the shaft, thereby transmitting one burst of radio frequency power for each vibration of said gauge. This transmission is effected by means of an aerial rotating with the shaft and the recovery of the radio signal so transmitted is carried out by means of a fixed aerial communicating with a receiver which demodulates the signal received and recovers the frequency of the vibrating wire gauge.

As has already been stated, it has hitherto been the practice to compare the frequency of the wire strain gauge to the frequency of a reference wire strain gauge. This has been done by communicating both frequencies to a cathode ray oscilloscope and changing the tension of the reference wire until equality of frequency between the wire strain gauge and the reference wire is indicated by the appearance of a stationary Lissajou figure on the cathode ray oscilloscope. The change in tension of the reference wire necessary to achieve equality of frequency can be related to the twist in the shaft. A particular advantage of the present invention is that the square pulses obtainable by demodulation of the radio signal can readily be counted, in a way which is not feasible with the low frequency harmonic variation in E.M.F. obtained directly from the wire. Moreover, these pulses can be subject to electronic frequency division, giving rise to pulses of much lower but proportionate frequency which can be individually transmitted, counted and recorded, e.g., on a moving track of paper, thereby providing a time record of events. A further advantage of the present invention is that the data so obtained may be recorded in digital form. The present invention is particularly suitable for use in circumstances wherein it is desirable to record the data so obtained at a point remote from the rotating shaft, for example, when a torsionmeter is attached to the propeller shaft of a ship and the recording instrument is locate don the bridge of the ship.

One embodiment of the present invention will now be described more in detail by way of example and with reference to the accompanying drawings in which:

FIG. 3 is a block diagram of the electrical relay system for one acoustic wire strain gauge.

Figure 1:
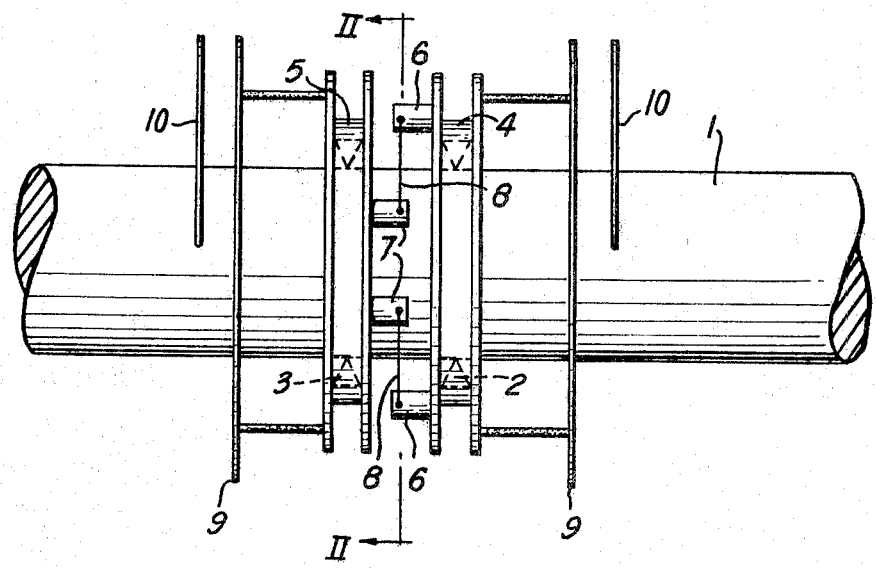
FIG. 1 is a side elevation of a section of shaft, the torque of which is to be measured.
Figure 2:
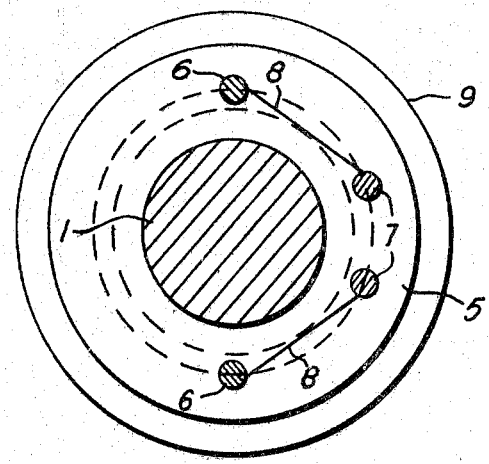
FIG. 2 is a section taken on the line II—II of FIG. 1.

With reference now to FIG. 1 and FIG. 2 there is shown a longitudinal section of a cylindrical shaft 1 on which are clamped two circumferential knife edges 2 and 3 by means of two annular collars 4 and 5, said knife edges defining a precise length of the shaft 1. Lugs 6 and 7, which are attached to the collars 4 and 5 respectively, protrude therefrom parallel to the shaft 1, and support two wire strain gauges 8 such that said gauges lie in a plane normal to the axis of said shaft. Circular transmitting aerials 9 are mounted on and adjacent to each of the collars 4 and 5, each of said transmitting aerials being in close proximity to a receiving aerial 10 which is positioned around the shaft 1 but mounted independently from it.

Referring to FIG. 3, lugs 6 and 7 support an acoustic wire strain gauge 8 which gauge is situated close to a pair of coils 11 and 12. Coils 11 and 12 are connected electrically to a radio transmitter 13 which, together with strain gauge 8 and coils 11 and 12, is mounted on the shaft 1, which transmitter comprises a maintaining circuit 14, an electronic switch 15, a radio frequency oscillator 16 and a transmitting aerial 9. A radio receiver 17, situated close to but not attached to the shaft 1, comprises a receiving aerial 10, a demodulator 18, a pulse shaper 19, an electronic divider 20 and an amplifier 21, said receiver 17 being electrically connected by way of a relay 22 to an event recorder 23. The event recorder 23 can readily be situated some distance from the shaft 1 if desired.

In operation the natural vibration of the wire strain gauge 8 induces an electromagnetic force (E.M.F.) in the coil 11 (pick-up coil), said coil 11 feeding this induced E.M.F. to the maintaining circuit 14 wherein it is amplified and the resulting amplified E.M.F. is fed back to the coil 12 (feed-back coil) in order to maintain the vibration of the wire strain gauge 8 at its natural frequency. The E.M.F. from the maintaining circuit 14 is fed to an electronic switch 15 which keys (turns on and off) a radio frequency oscillator 16 and the resulting sharply modulated radio frequency signal is transmitted by the transmitting aerial 9. Said radio frequency signal is picked up by the receiving aerial 10 of the radio receiver 17 and this signal is then fed into the demodulator 18 which converts the radio frequency as received into a somewhat square oscillation of audio frequency, i.e., the wire frequency which oscillation can be further shaped and sharpened by means of a pulse shaper 19. The thus recovered wire frequency is then reduced to a more recordable frequency in the range of 0.1–10, preferably 1–2 cycles per second by the electronic divider 20, and by means of a relay 22, operating at the same reduced frequency, an event recorder digitally records the total number of vibrations of the wire strain gauge 8 during a given period of time.

The event recorder can be so chosen and arranged that a record of the total vibrations of each strain gauge employed for the purposes of the present invention is made at the same time and thus a comparison of the differing frequencies of the gauges, due to twist in the shaft, can be made simultaneously and thence the torque of the rotating shaft can be determined accurately as hereinafter shown.

Each wire strain gauge to be used is initially calibrated to determine accurately the frequency versus extension characteristic. For each strain gauge a given change of length causes a proportional change in the square of the wire frequency. The square of the frequency of each strain gauge as found during operation of the apparatus in accordance with this invention is compared with its (frequency)$^2$ when there is no torsion in the shaft and the corresponding extention or contraction may be found from the calibration data. The length of shaft under test, i.e., the length of shaft defined by the knife edges, and an assumed value of the modulus of rigidity for the material of the shaft are used to convert the above changes of length into torque. From this result, in combination with the mean r.p.m. of the shaft, the shaft horse power can also be determined.

I claim as my invention:

1. An apparatus for measuring the torque of a rotating shaft comprising:
   an acoustic wire strain gauge, said wire strain gauge being operably attached to said shaft;
   a feedback coil, said feedback coil being disposed adjacent said wire strain gauge;
   a pickup coil, said pickup coil being disposed adjacent said wire strain gauge;
   a radio transmitter, said radio transmitter being mounted on said shaft, said pickup coil being coupled to said radio transmitter to modulate the signal transmitted by said radio transmitter, said feedback coil being coupled to said pickup coil;
   an antenna, said antenna being mounted on said shaft and coupled to said radio transmitter;
   a radio receiver, said radio receiver being mounted adjacent said shaft, said radio receiver receiving the signal transmitted by said radio transmitter, demodulating said transmitter signal and supplying said signal as a pulse wave; and
   means coupled to said radio receiver for recording a sum related to the frequency of said pulse wave.

2. The apparatus of claim 1 in which the acoustic strain gauge is mounted on the shaft by means of two spaced ring members, said ring members having a circumferential knife edge formed on their inner surface, a pair of collars for clamping said ring members to said shaft, a post member projecting from each ring member towards the opposite ring member and aligned with the axis of said shaft, said strain gauge being fastened to said post members.

3. The apparatus of claim 1 in which a pair of acoustic wire strain gauges are mounted on the shaft in the manner that one is tightened and the other is slackened by torque in the shaft and separate means are provided for recovering and transmitting the separate frequencies of each of said acoustic wire strain gauges.

References Cited by the Examiner

UNITED STATES PATENTS 3,062,043  11/1962  Marsh et al. _____ 73—88.5

FOREIGN PATENTS 537,649  11/1931  Germany.
151,076  1962  Russia.

RICHARD C. QUEISSER, *Primary Examiner.*

C. A. RUEHL, *Assistant Examiner.*